United States Patent [19]

Isdahl et al.

[11] Patent Number: 5,140,776
[45] Date of Patent: Aug. 25, 1992

[54] APPARATUS AND METHOD FOR MEASURING AND MAINTAINING THE PROFILE OF A RAILROAD TRACK RAIL

[75] Inventors: Darwin H. Isdahl, Elk River; Robert J. Monson, Minneapolis, both of Minn.

[73] Assignee: Loram Maintenance of Way, Inc., Hamel, Minn.

[21] Appl. No.: 640,575

[22] Filed: Jan. 14, 1991

Related U.S. Application Data

[63] Continuation of Ser. No. 537,872, Jun. 13, 1990, abandoned, which is a continuation of Ser. No. 295,910, Jan. 11, 1989, abandoned.

[51] Int. Cl.⁵ .............................................. B24B 49/00
[52] U.S. Cl. ............................. 51/165.71; 51/165.72; 51/241 LG
[58] Field of Search .......... 51/241 R, 165.71, 165.72, 51/178, 241 LG; 144/359

[56] References Cited

U.S. PATENT DOCUMENTS

| | | | |
|---|---|---|---|
| 4,566,225 | 1/1986 | Bizot et al. | 51/165.72 |
| 4,658,550 | 4/1987 | Myers | 51/165.72 |
| 4,785,589 | 11/1988 | Buhler | 51/178 |
| 4,839,994 | 6/1989 | Heesemann | 51/165.72 |

FOREIGN PATENT DOCUMENTS

| | | | |
|---|---|---|---|
| 0235602 | 9/1987 | European Pat. Off. | 51/178 |
| 2523375 | 12/1976 | Fed. Rep. of Germany | 51/165.72 |

OTHER PUBLICATIONS

Brochure entitled "Ultrasound-Liteslice", Ultra Sound International Pty. Ltd.
Brochure entitled "Optical Rail Image & Analysis Orian", KLD Associates, Inc.

Primary Examiner—M. Rachuba
Attorney, Agent, or Firm—Patterson & Keough

[57] ABSTRACT

A strobe light, oriented directly over a railroad track rail and at a 45° angle to the horizontal, projects a light line across the rail. A pair of cameras oriented directly over the rail view the light image on the rail. The light lines reflected from the foot of the rail provide a reference for numerically describing the profile of the railhead. The measured rail profile is compared to an ideal rail profile. The results of the comparison are used to position grinding modules for grinding the rail to a preferred profile.

25 Claims, 14 Drawing Sheets

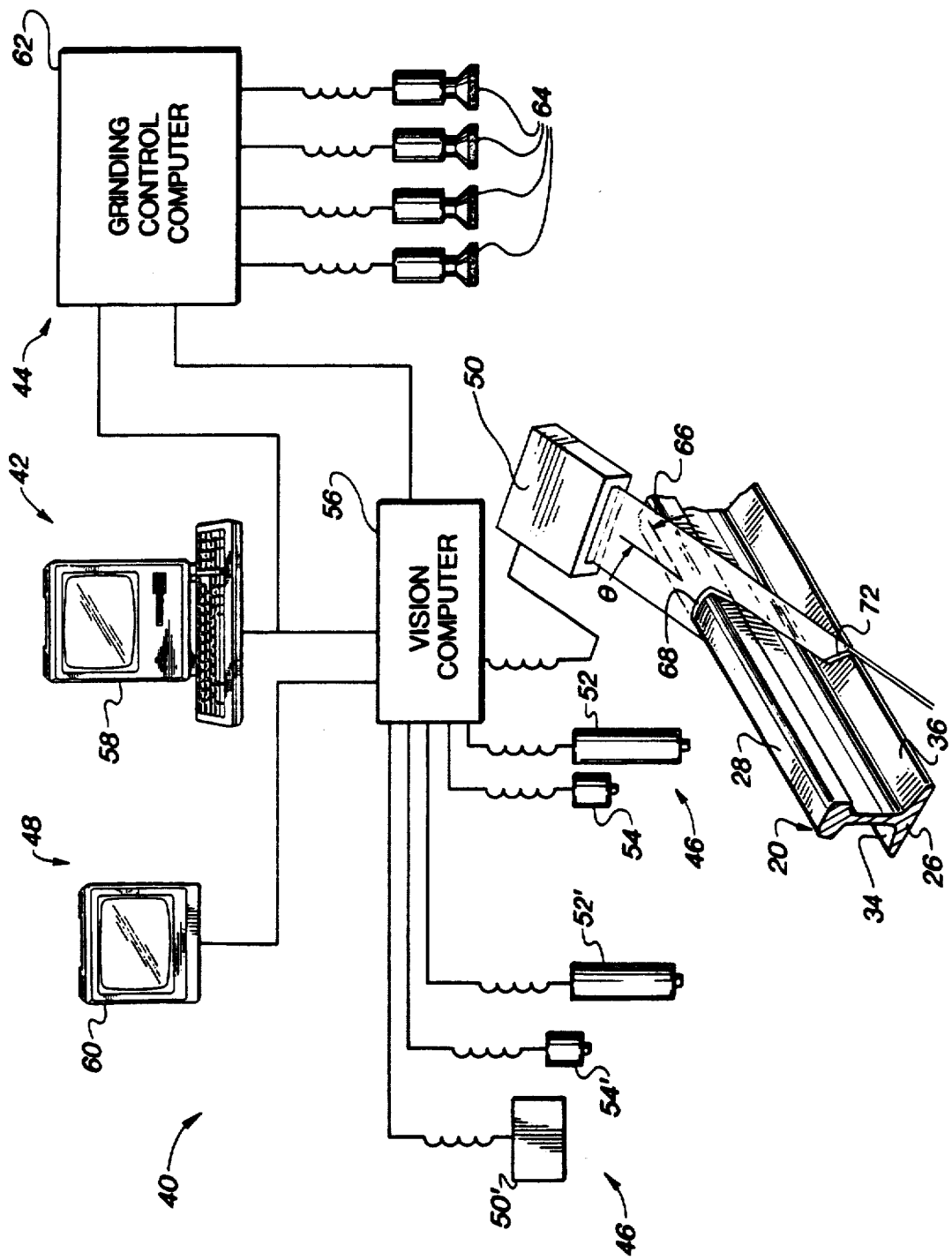

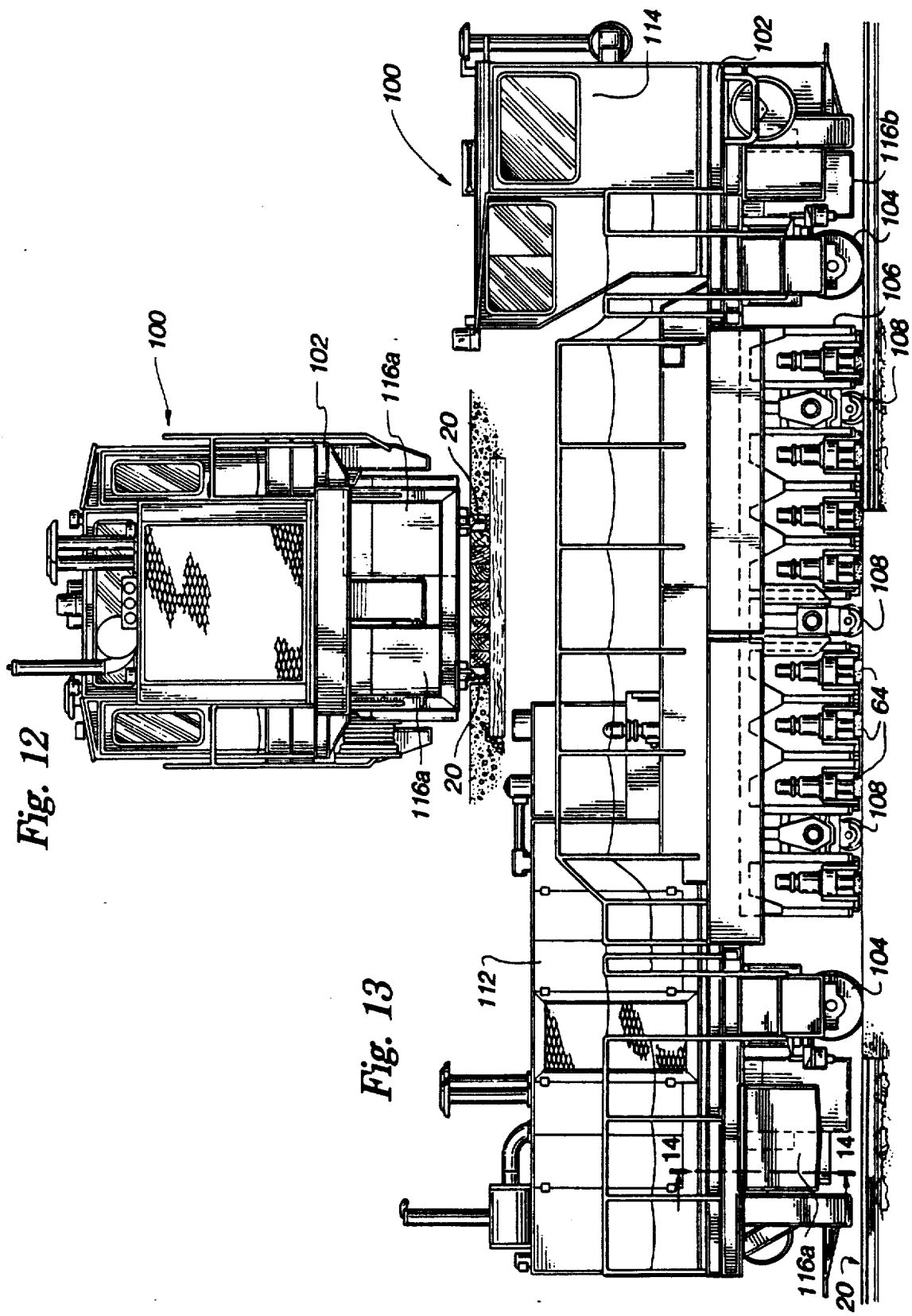

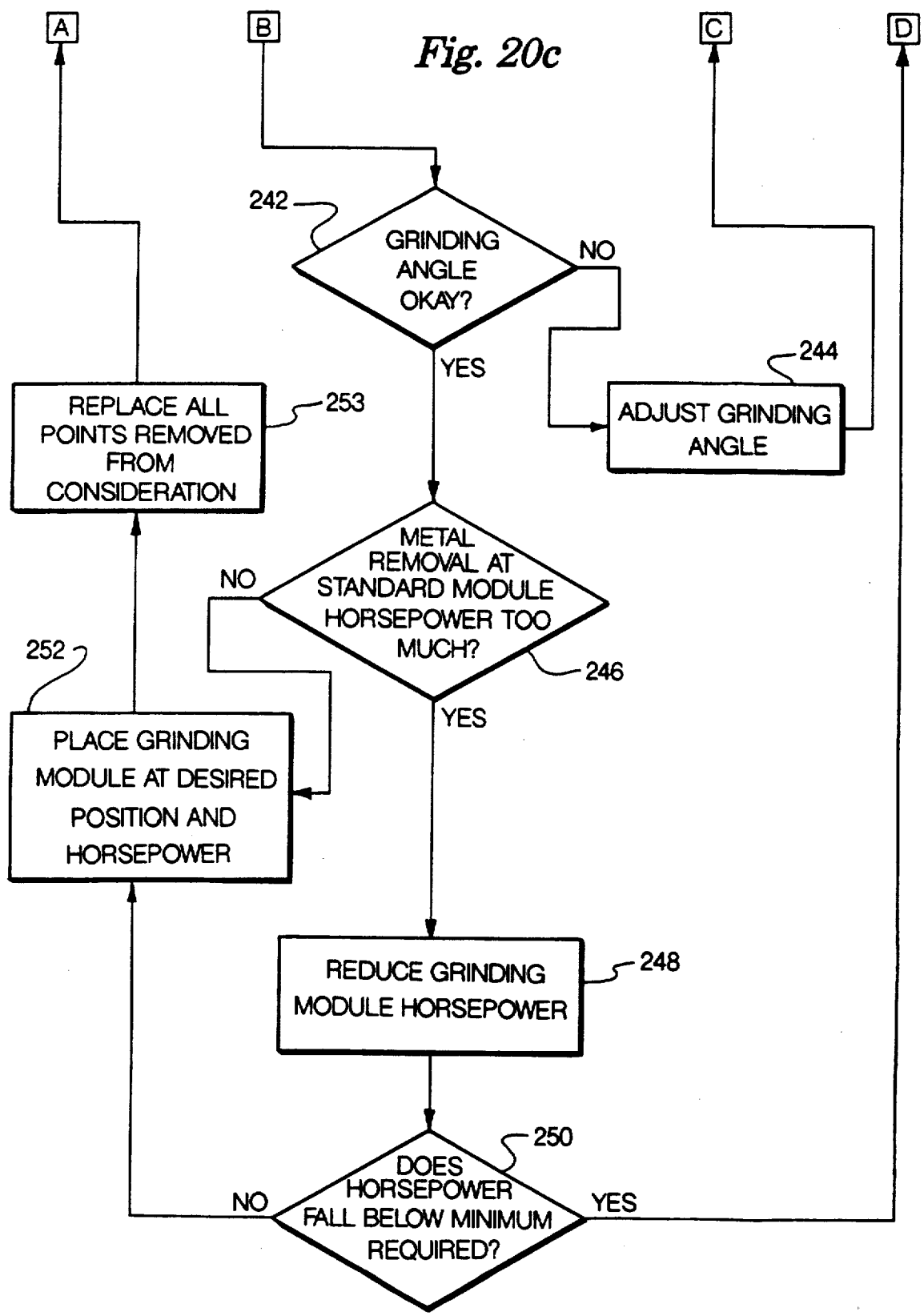

APPARATUS AND METHOD FOR MEASURING AND MAINTAINING THE PROFILE OF A RAILROAD TRACK RAIL

This is a continuation of Ser. No. 537,872 filed Jun. 3, 1990, now abandoned, which is a continuation of Ser. No. 295,910 filed Jan. 11, 1989 now abandoned.

BACKGROUND OF THE FIELD

This invention relates to the maintenance of railroad track rails. In particular, it relates to a method and apparatus for measuring the profile of a railroad track rail and for restoring the profile to a preferred configuration.

BACKGROUND ART

Railroad track rails are subject to wear due to the passage of trains over the rails. Burrs, corrugations, and uneven wear of the rail head are common deformities created in railroad track rails by the passage of heavy rolling stock over the rails. Unchecked, such wear can lead to rail failure and derailment of trains using the rails.

The replacement of track rails is labor intensive and extremely expensive. Accordingly, specialized rail grinding machines have been developed to restore worn and deformed rails to their original profile. An example of such a rail grinding machine is disclosed in U.S. Pat. No. 4,622,781. A grinding stone for use in such grinding machines is disclosed in U.S. Pat. No. 4,693,039.

Successful restoration of a rail depends on accurate determination of the defects in the rail profile prior to grinding, proper placement of the grinding stones during the grinding process, and accurate measurement of the rail profile subsequent to grinding. Measurement of rail profiles has traditionally been accomplished with the use of so called star gauges that have a plurality of different radiused edges. An edge of the star gauge that has a radius similar to the desired radius of the measured rail is manually placed on the head of the rail and is visually checked to determine whether any space exists between the star gauge and the rail head. If there is a space (indicating a deformity in the rail profile), grinding stones of a rail grinding machine are set in one of several predetermined, standard grinding patterns, based on the judgment of the machine operator.

It will be appreciated that the traditional, manual method of determining the profile of a railroad track rail is highly subject to measurement inaccuracies and operator skill. Moreover, while use of a star gauge provides at least a qualitative measure of the rail running surface radius, the presence of burrs, gauge wear, and off center alignment of the railhead are subject to only a visual check. Modern rail grinding machines can control grinding to within several thousandths of an inch tolerance. The ability to maintain such tight tolerance can be in large part wasted when rail measurement and grinding stone orientation are done by an unskilled or inexperienced operator.

An automated apparatus and method that would accurately measure the profile of a railroad track rail prior to grinding, and that could be used in a grinding system to set the grinding stones in an optimal orientation for grinding based on the measurement, would provide a decided advantage.

SUMMARY OF THE INVENTION

The problems outlined above are in large measure solved by the apparatus and method for measuring and maintaining the profile of a railroad track rail in accordance with the present invention. The method and apparatus hereof provides an accurate measurement of the profile of a rail that is largely independent of operator judgment or skill. A unique method for placing the stones of a grinding machine is disclosed that restores a worn rail to an acceptable profile with a minimum of grinding of the rail.

The apparatus for measuring a rail profile in accordance with the present invention includes a light strobe for projecting a beam of light onto the rail to be measured. A pair of optical cameras view the light beam projected onto the rail, and provide an electronic signal indicative of the light beam shape. The light lines reflected from the foot of the rail are viewed by one of the cameras to provide a reference point for measuring the profile of the railhead. The second camera receives the light reflected from the crown surface of the railhead.

The information received through the optical cameras is digitized and compared to the profile of an ideal rail. The difference between the actual profile and ideal profile is then calculated, and the comparison information is manipulated in a unique way to ensure optimal positioning of the grinding machine's grinding stones.

BRIEF DESCRIPTION OF THE DRAWINGS

FIG. 8 is a block diagram of the apparatus for measuring and maintaining the profile of a track in accordance with the present invention;

FIG. 12 is a front elevational view of a grinding machine having an apparatus for measuring and maintaining the profile of a track rail in accordance with the present invention mounted thereon;

FIG. 13 is a side elevational view of the grinding machine shown in FIG. 12;

FIGS. 20a through 20c are flow charts depicting in greater detail the Place Stones step of FIG. 18.

DETAILED DESCRIPTION OF THE DRAWINGS

Figure 1:
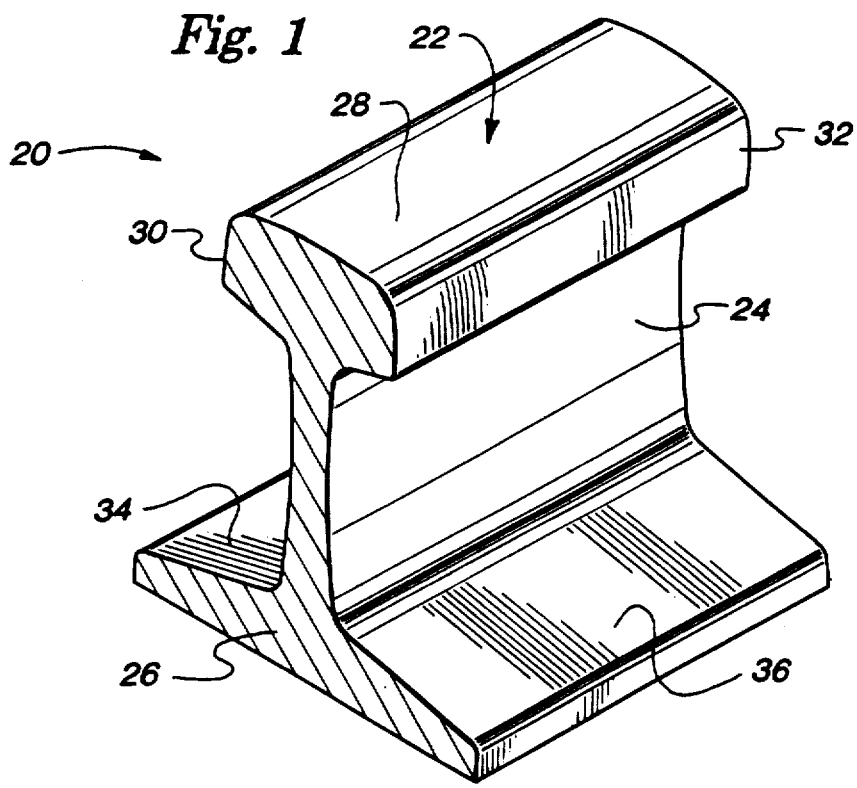
FIG. 1 is a perspective view of a section of a typical railroad track rail.
Figure 2:
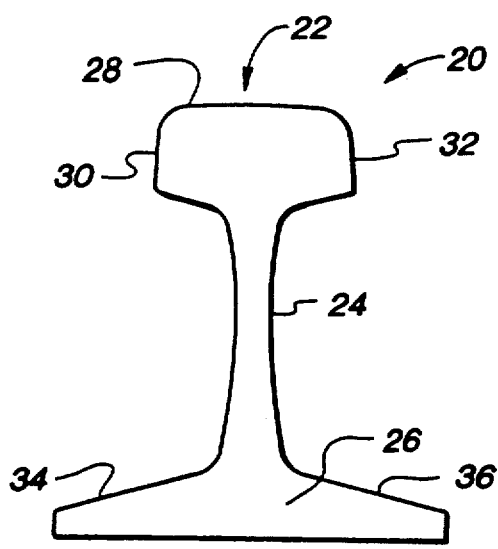
FIG. 2 is an elevational view of the rail depicted in FIG. 1.
Figure 3:
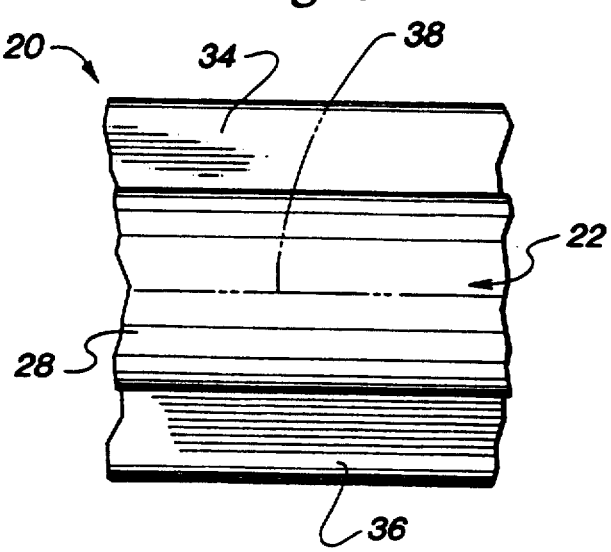
FIG. 3 is a plan view of the rail depicted in FIG. 1.

The method and apparatus for measuring and maintaining the profile of a railroad track rail in accordance with the present invention is best understood in conjunction with a detailed explanation of the structure of a typical railroad track rail 20. Referring to FIGS. 1, 2, and 3, a typical rail 20 includes railhead 22, web 24, and foot 26. The railhead 22 includes upper, arcuate, crown surface 28, and opposed head sidewalls 30, 32. Web 24 defines vertical rail centerline c in a vertical, center line plane. Crown surface 28 presents a surface radius of about six inches to about fourteen inches, depending upon user specifications. Foot 26 includes opposed, inclined, field side and gauge side upper surfaces 34, 36. The railhead 22, web 24 and foot 26 are preferably symmetrically formed about centerline c.

Figure 4:
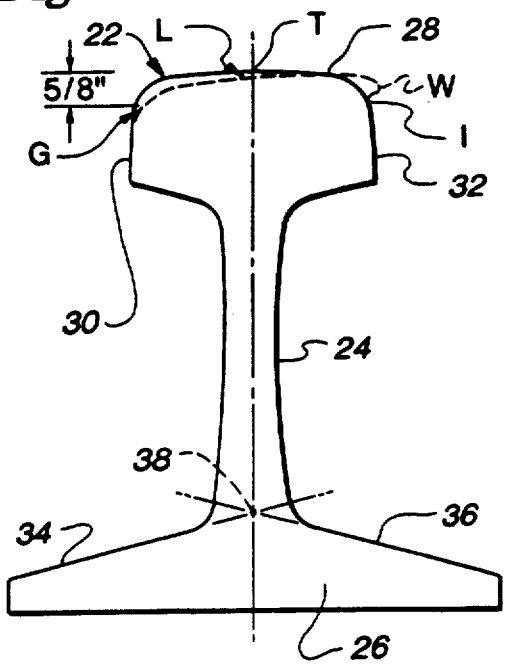
FIG. 4 is an elevational view of an ideal railroad track rail with the profile of a worn track rail indicated in phantom line.
Figure 5:
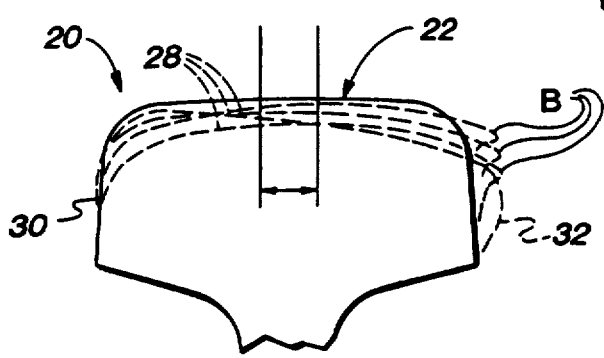
FIG. 5 is an enlarged, elevational view of the railhead of an ideal railroad track rail, with profiles of various worn railheads superimposed thereon in phantom lines.

FIG. 4 depicts an ideal railroad track rail I with the profile of a worn rail W superimposed thereon in phantom lines. Headloss L is the vertical difference between the ideal profile I and the worn profile W at the centerline c of the rail. Alternatively, head loss can be measured as the percentage loss of area in a transverse cross section of the head. Gauge wear G is the horizontal difference between the worn rail W and ideal rail I at the gauge side head sidewall 30 of the rail, as measured ⅝th of an inch below the top T of the ideal rail profile I. The portion RS of the crown surface 28 which comes into actual contact with the wheels of a railroad car is commonly referred to as the rail running surface (see FIG. 7). FIG. 5 shows the profile of various worn rail configurations in phantom lines, superimposed on the profile of an ideal rail. Note, in particular, the occurrence of burrs B on the field side of the rail.

Figure 6:
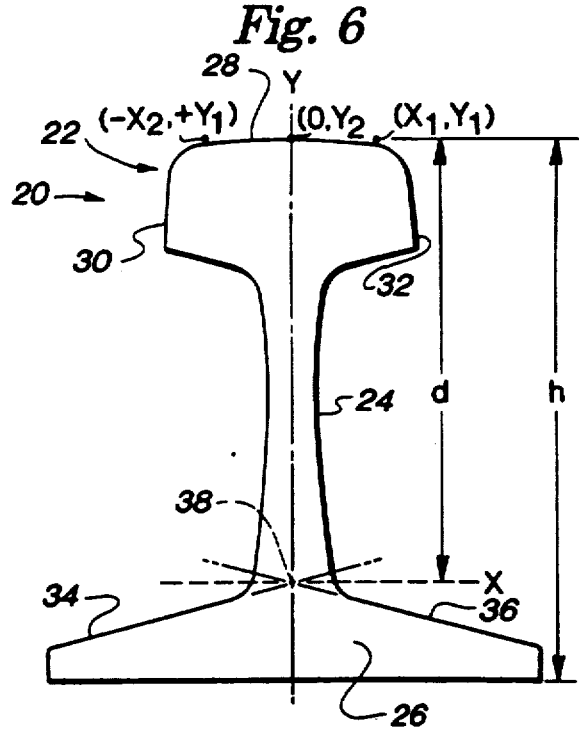
FIG. 6 is a schematic view of a typical railroad track rail.

Referring in particular to FIG. 6, the inclined field side and gauge side foot upper surfaces 34, 36 define planes that intersect along a line 38 in the center line plane. The angle of inclination of the foot upper surfaces is held to an industry standard 14°. Variance of the intersection line 38 from the vertical plane of the centerline c is accordingly less than $+/-1/32''$, and the vertical distance of line 38 above the bottom surface of the rail 20 remains constant to within $+/-1/32''$. Referring to FIG. 6, the overall height (h) of the rail can therefore accurately be determined if the distance (d) between the crown surface 28 and the line 38 can be accurately determined. Moreover, the line 38 provides an origin for locating points in x and y coordinates on the crown surface 28 of a cross section of the rail 20.

The apparatus 40 for measuring and maintaining the profile of a railroad track rail in accordance with the present invention is specifically designed to take advantage of the above described structure of a track rail. Referring to FIG. 8, the apparatus 40 broadly includes a vision system 42 and a grinding system 44. The vision system 42 includes an optical front end 46 and control section 48. The optical front end 46 includes a strobe light 50, railhead camera 52, and rail foot camera 54. Control section 48 includes vision computer 56, terminal 58, and display 60. A second optical front end 46 having additional cameras 52', 54' and strobe light 50' can be connected to the vision computer 56 for viewing a second rail, or for viewing the same rail in a different position (i.e., behind the grinding modules for immediate evaluation of the grinding process). Grinding system 44 includes grinding control computer 62 and grinding modules 64.

Figure 11:
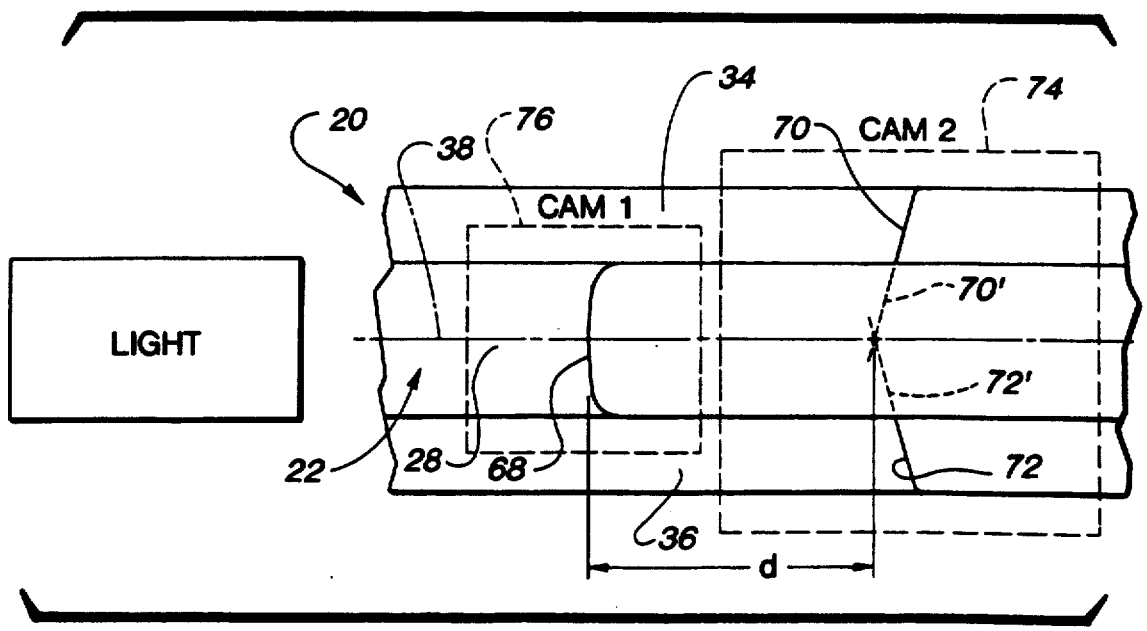
FIG. 11 is a schematic view of a typical railroad track rail indicating the placement of the light beam on the track rail.
Figure 9:
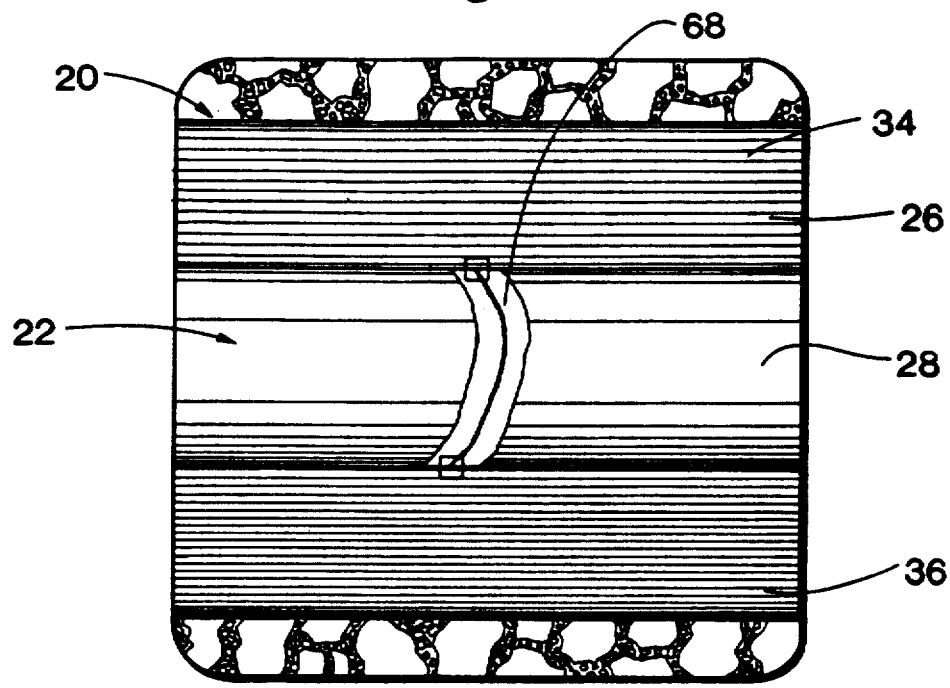
FIG. 9 depicts the light line projected onto the railhead of a railroad track rail by the vision system of the apparatus in accordance with the invention.
Figure 10:
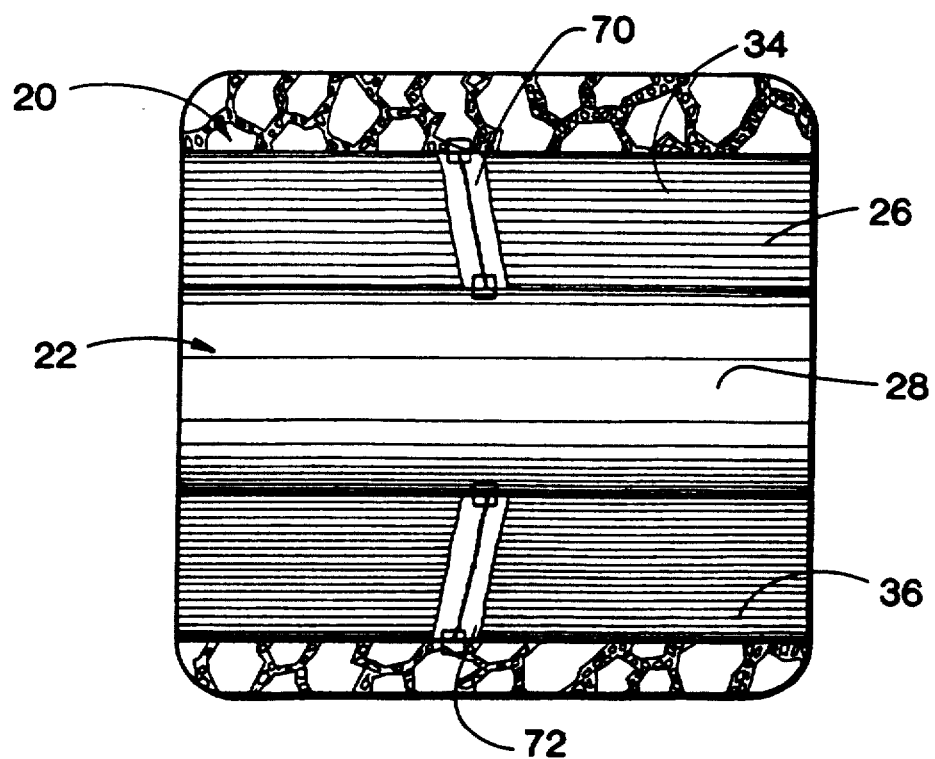
FIG. 10 depicts the light lines projected onto the foot of the rail.
Figure 14:
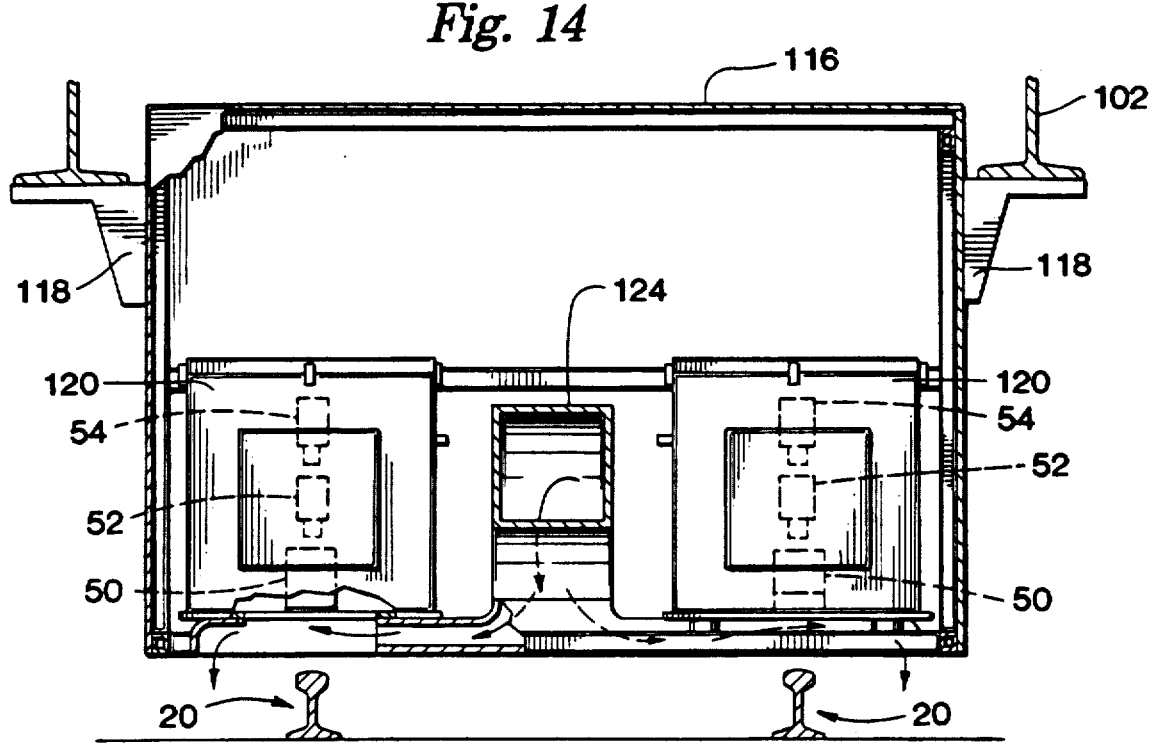
FIG. 14 is a sectional view taken along line 14—14 of FIG. 13 depicting the optical front ends of the vision system in accordance with the present invention mounted within an environmental protective container.
Figure 15:
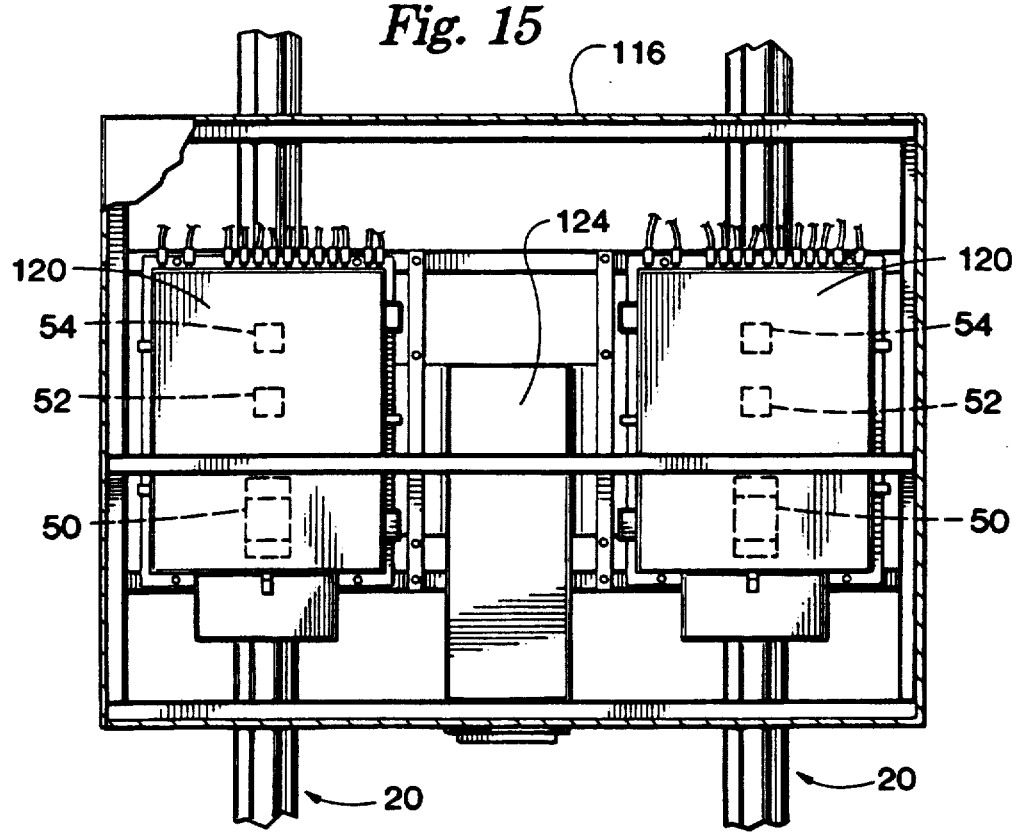
FIG. 15 depicts the structure depicted in FIG. 14, but from a top plan view.
Figure 16:
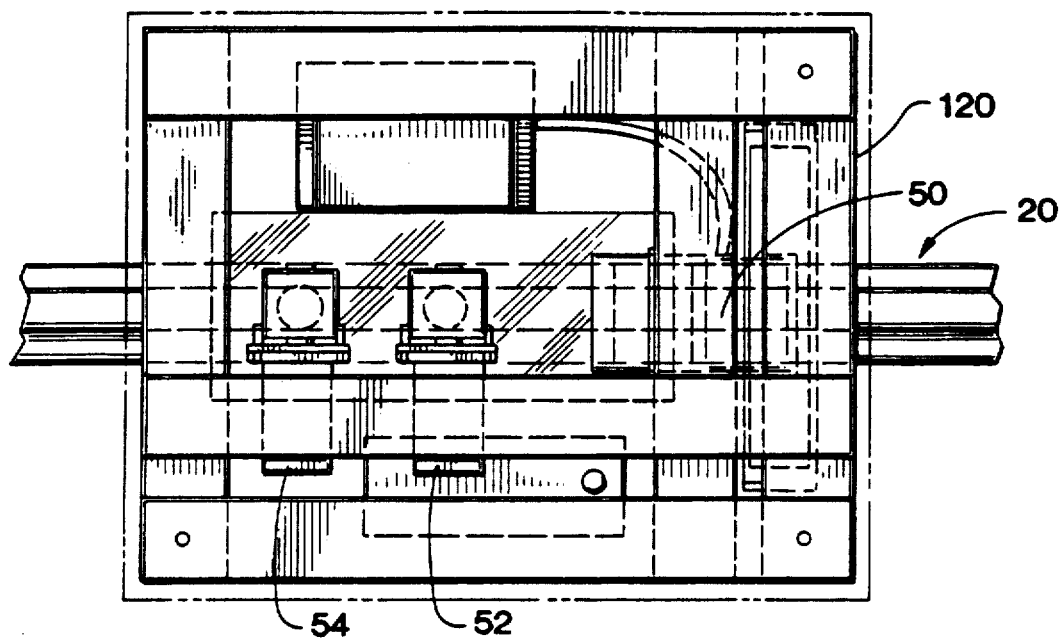
FIG. 16 is an enlarged top plan view of an optical front end of the vision system.
Figure 17:
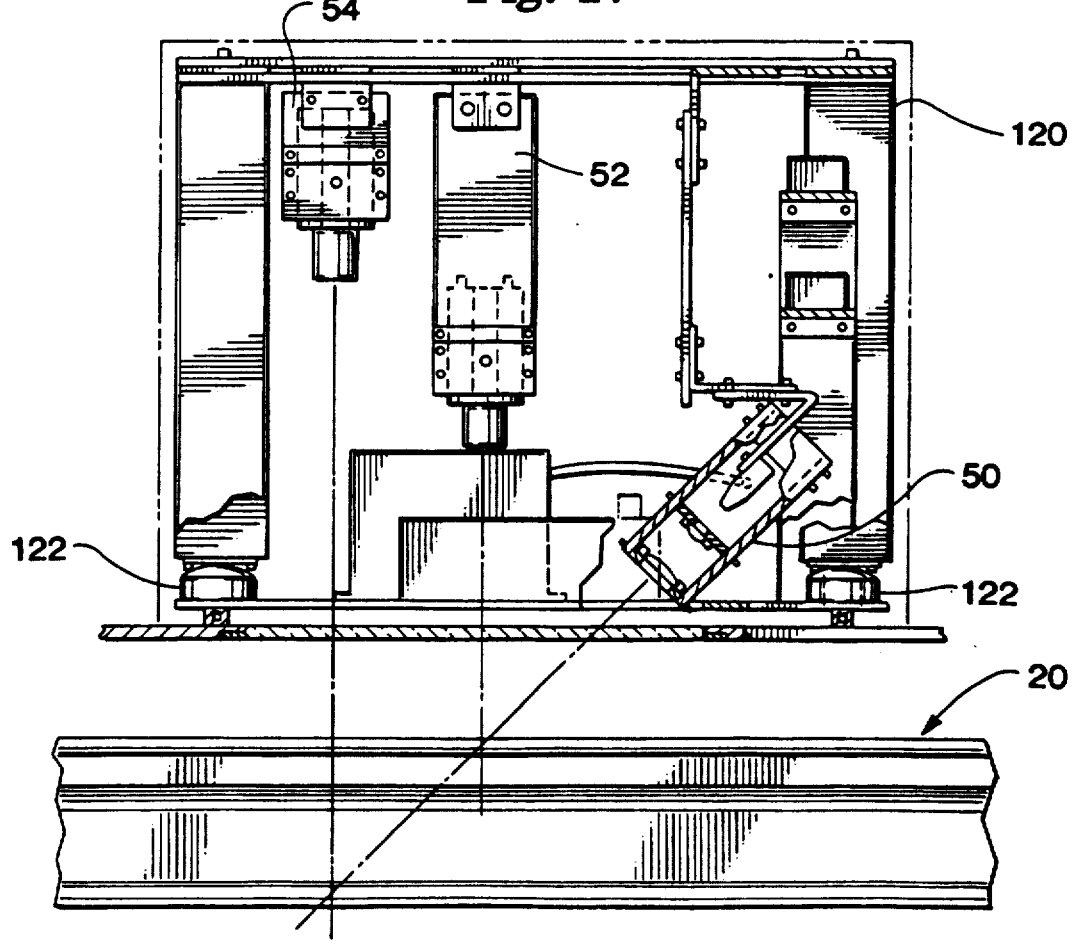
FIG. 17 is a sectional, elevational view of the structure depicted in FIG. 16.

The strobe light 50 is oriented at an angle $\theta$ relative to the horizontal, and projects a generally planar beam of light 66 on to rail 20. Referring to FIGS. 9, 10, and 11, the reflection of the angled light beam 66 from the rail 20 presents an illuminated, arcuate light line 68 on the railhead 22, and linear light lines 70, 72 on the foot upper surfaces 34, 36. It will be appreciated that the precise configurations of the light lines 68, 70, 72 are a function of the profile of the surfaces of the rail 20.

FIG. 11 is a schematic, top plan view of the illuminated lines 68, 70, 72 reflected by the rail 20, as seen by the railhead camera 52 and foot camera 54. The field of view of cameras 52, 54 are indicated by phantom lines 74, 76. Referring to FIG. 11, it will be understood that the extension of linear light lines 70, 72, as depicted by dashed lines 70', 72', intersect at rail cenerline c. Moreover, when the strobe light 50 is oriented at a preferred angle of $\theta = 45°$, the horizontal length d (as depicted in FIG. 11) is equal to the vertical height d (as depicted in FIG. 6), since $\tan 45° = 1$. Using the intersection point of extended light lines 70', 72' as a reference, sample points along arcuate light line 68 can be represented in two dimensional, x-y coordinates. The x-y coordinates, as will be discussed in detail below, can be used to compare the actual rail profile to an ideal rail profile, and the comparison data can be used for optimum placement of grinding modules 64.

The apparatus 40 for measuring and maintaining the profile of a rail is depicted as mounted on a grinding machine 100 in FIGS. 12 and 13. The rail grinding machine 100 is a self-propelled vehicle having a main frame 102 supported on railroad track rails 20 by rail engaging wheels 104. An undercarriage 106 depends from the main frame 102, and is supported along the railroad track rails 20 by undercarriage rail engaging wheels 108. The plurality of grinding modules 64 are carried by the undercarriage 106. The grinding machine includes an engine compartment 112 and operator's cab 114.

The optical front end 46 of the vision system 42, comprising strobe light 50, and cameras 52, 54, is mounted within an environmental enclosure 116. Referring to FIGS. 14–17, a separate optical front end 46 with its own strobe light 50, and separate pair of rail head and rail foot cameras 52, 54 is dedicated to each of the two track rails 20. Moreover, referring to FIG. 13, front and rear environmental enclosures 116a, 116b, each having its own optical front ends 46 can be mounted in front of (116a), and following (116b) the grinding modules 64.

The environmental enclosure 116 provides a temperature controlled, clean environment for the optical front ends 46 of the vision system 42. Enclosure 116 is mounted by brackets 118 to a carriage mounted to the frame 102 of grinding machine 100. The cameras 52, 54 and associated strobe light 50 of each optical front end 46 are contained within an individual optical equipment box 120. Each box 102 is mounted on shock absorbing pads 122 within the enviromental enclosure 116. Ventilation duct 124 provides a path for forced air to travel across the field of view of the cameras 52, 54 and outwardly onto the rails 20, thereby clearing the field of view from dust, dirt, snow, and debris.

Figure 18:
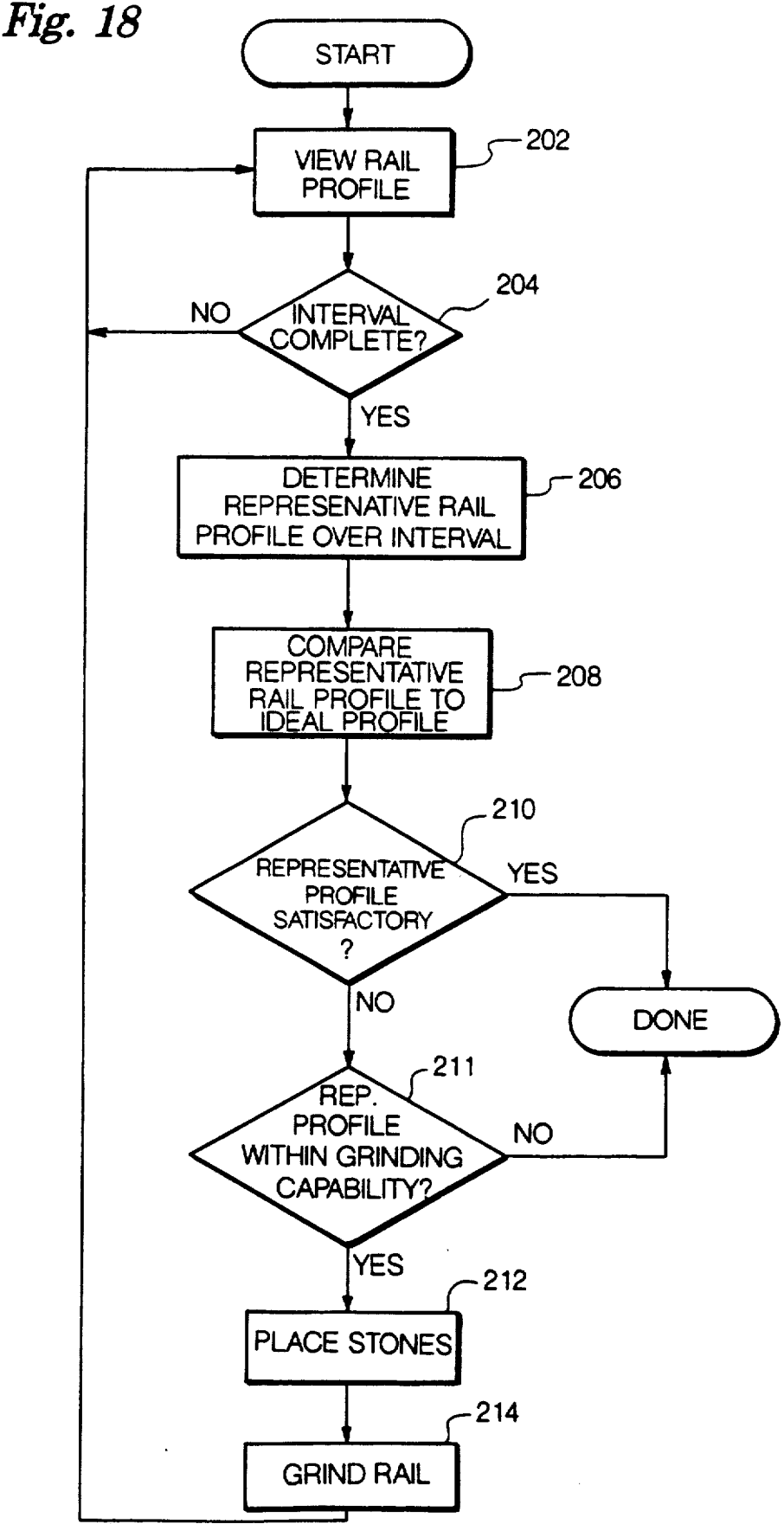
FIG. 18 is a flow chart depicting the method for measuring and maintaining the profile of a railroad track rail in accordance with the present invention.
Figure 19:
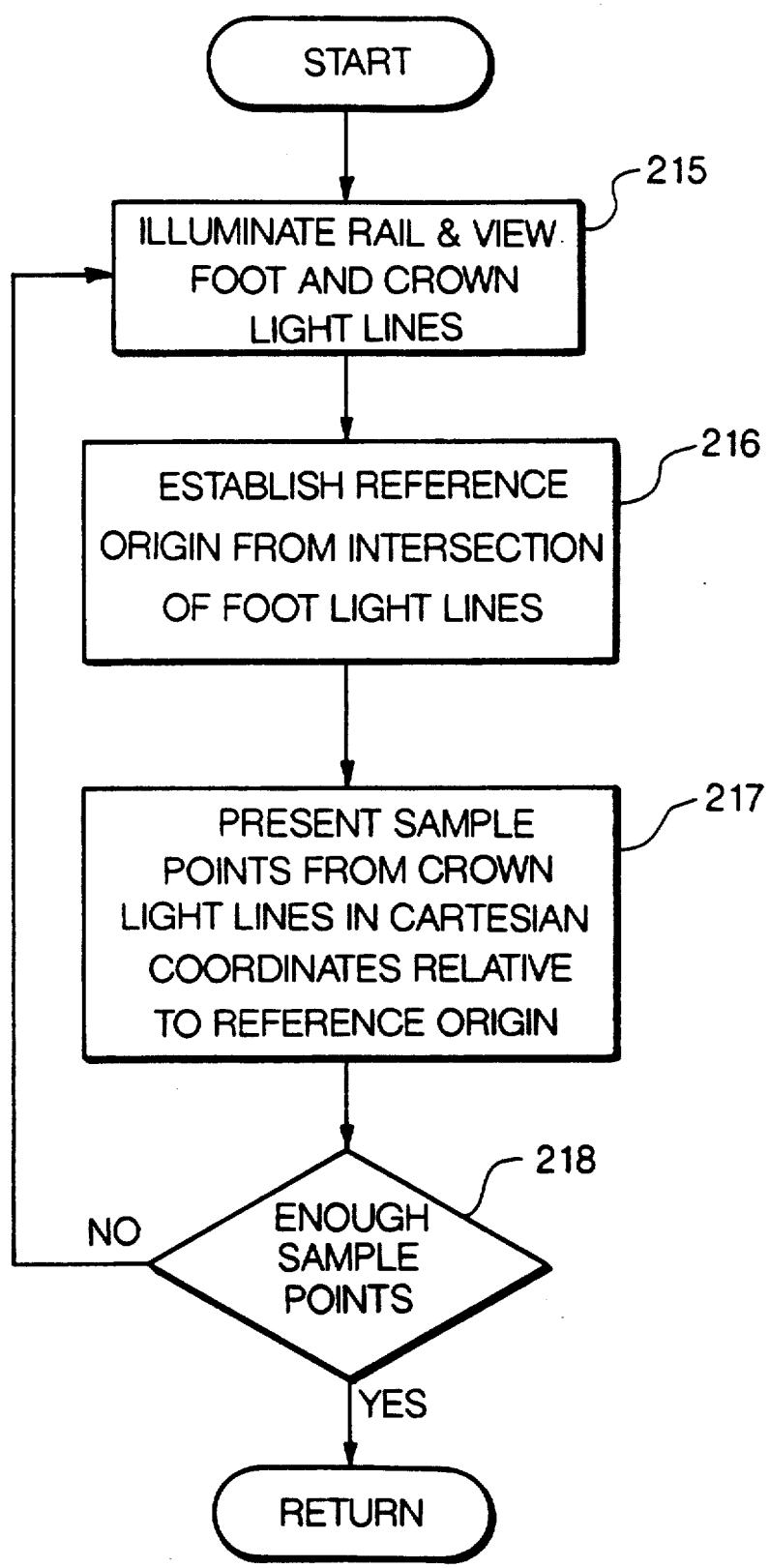
FIG. 19 is a flow chart depicting in greater detail the View Rail Profile step of FIG. 18.
Figure 20A:
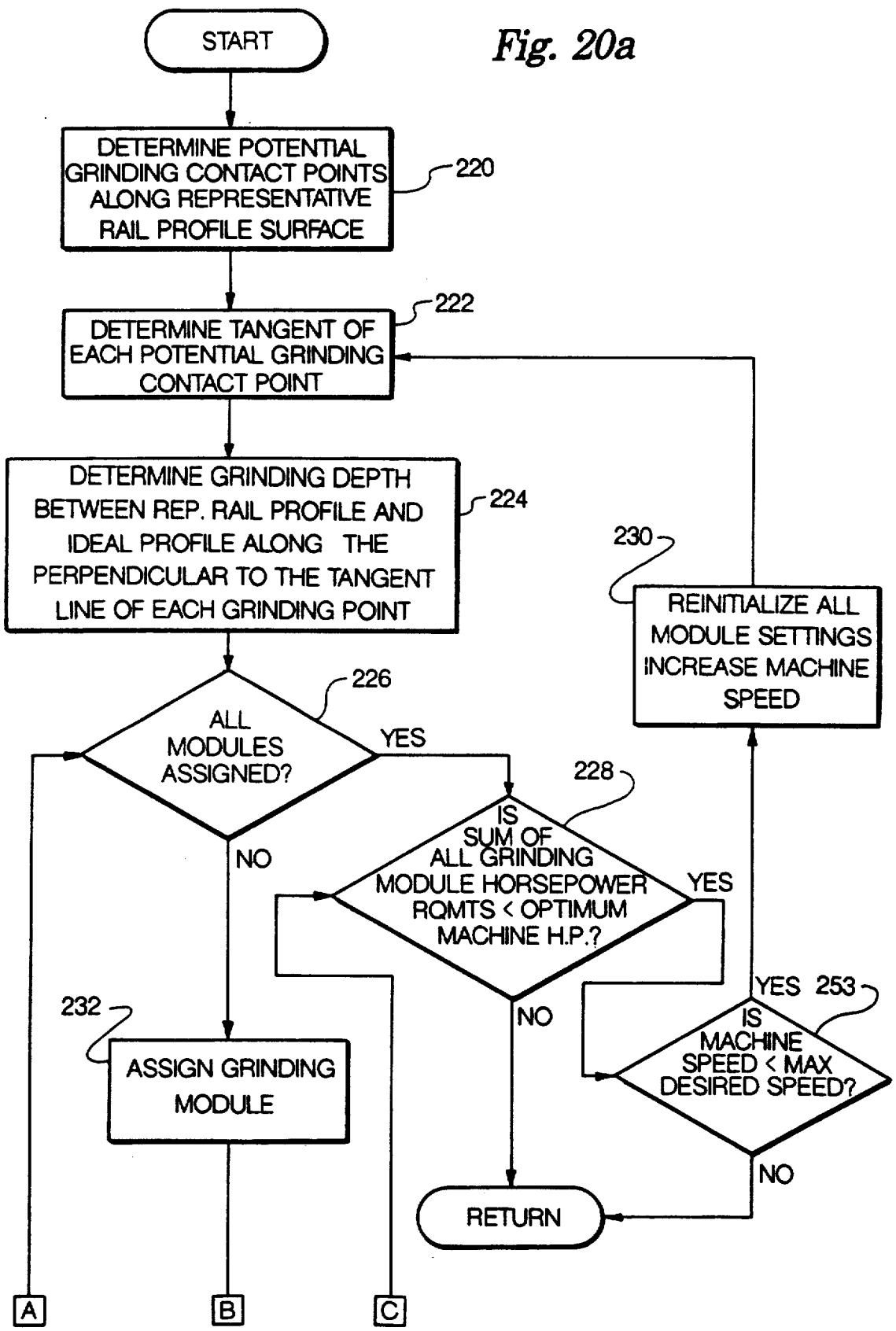
Figure 20B:
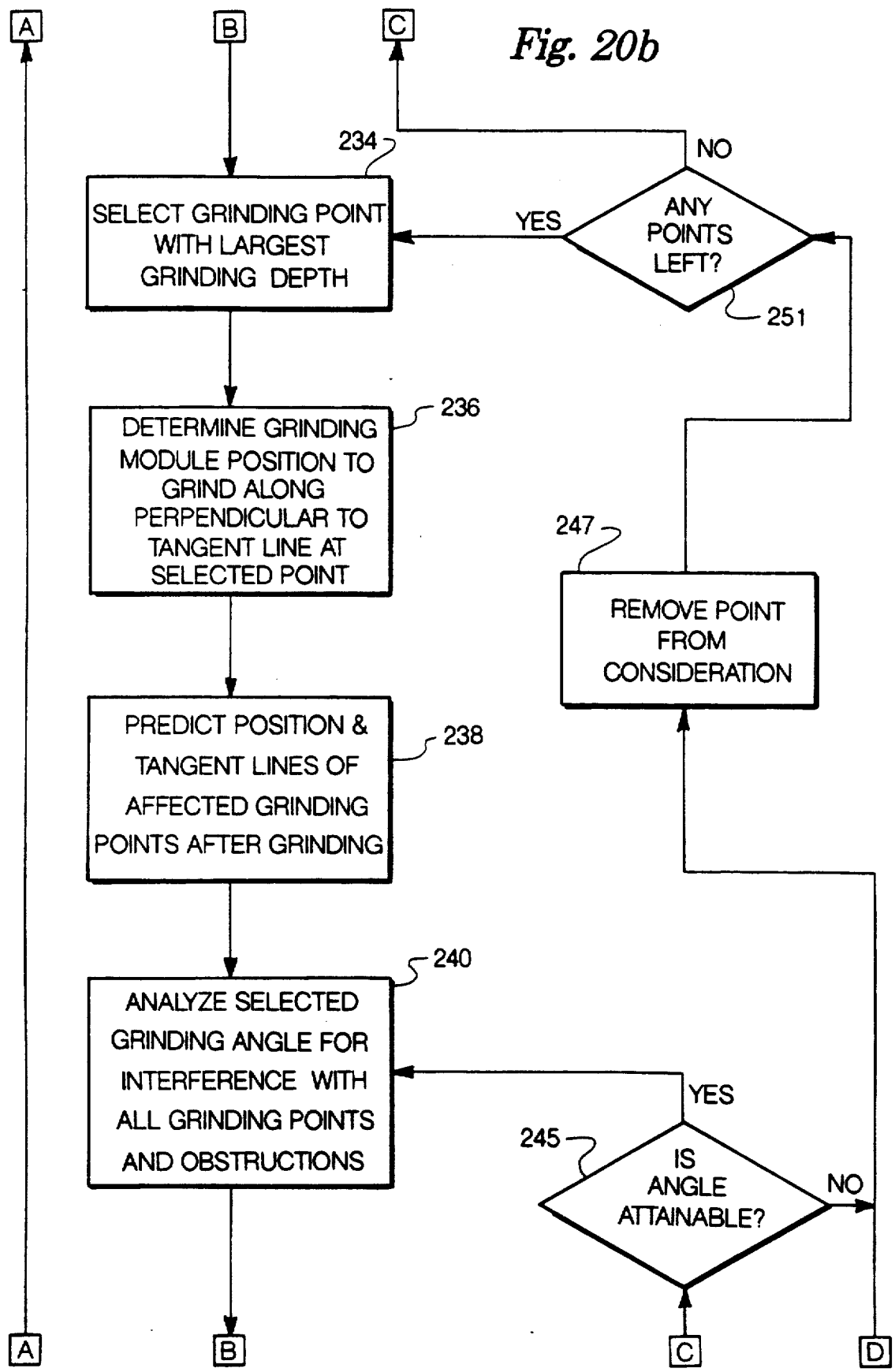

The process for measuring a railroad track rail and restoring the profile of the rail through grinding in accordance with the present invention is depicted in flow chart form in FIGS. 18–20.

Referring to FIG. 18, the process is begun at program block 202 by using vision system 42 to view a rail 20 to determine the rail profile. The view rail profile step is discussed in detail below, and is depicted in greater particularity in FIG. 19.

Program flow is directed from the view rail profile step 202 to decision block 204 for determination of whether enough profiles over a given interval of railroad track rail have been acquired to compute a representative rail profile for the interval. The determination of whether enough profiles have been taken to comprise a complete interval can be done in one of two ways. In the first method, a predetermined number of rail profiles can be chosen to comprise a complete interval. Once the appropriate number of profiles have been accepted, program flow would be directed to block 206 for determination of a representative rail profile over the interval. In this regard, it will be appreciated that the profile of a rail will change along the length of the rail. A "representative rail profile" could be an average of each of the profiles taken along the interval, a median of the profiles, a least square's fit, or any other numerical analysis of the profiles within the given interval.

The second method for computing an acceptable representative profile is to compute the representative profile on the fly from each of the rail profiles as they are acquired. An "interval" would be considered as complete once the trend of the representative profile becomes constant.

With either method, a new rail profile will be viewed at generally evenly spaced lengths (such as every 36 inches) along the railroad track rail, and the viewed rail profiles will be manipulated to present a representative profile at least every 39 feet (39 feet being the length of a typical railroad track rail in a jointed railroad track system).

Moreover, viewing of the rail profile is a continuous process. The optical front end 46 in the enclosure 116b at the rear of the grinding machine 100 can be used to prepare a representative rail profile for a second grinding pass as the rail is ground during a first forward grinding pass of the machine 100 over the rail.

Once a representative rail profile for an interval of railroad track is determined, program flow is directed to block 208 where the representative rail profile is compared to the profile of an ideal rail. The comparison is made in order to determine what metal should be removed to restore the viewed rail's profile to an ideal shape. The definition of an "ideal" profile can depend on the kind of terrain over which the railroad track is laid, the type of loads carried by trains using the railroad track, or on whether the rails of the track are on a straightaway, a curve, or a switch. Moreover, individual railroad companies may have differing criteria for the shape of an "ideal" rail. The differing descriptions of what an "ideal" rail profile comprises can each be stored in the memory of grinding control computer 62 and can be retrieved from memory as needed.

Figure 7:
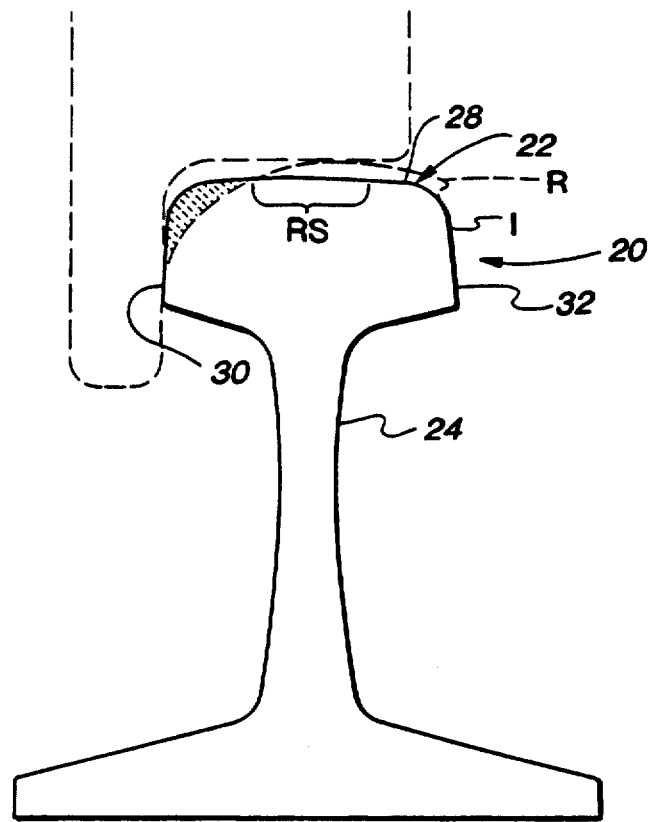
FIG. 7 is an enlarged, elevational view of an ideal rail, with a representative worn rail profile and the wheel of a railroad car depicted in phantom lines.

The step of comparing the representative rail profile to an ideal profile is best understood with reference to FIG. 7. In FIG. 7, a representative rail profile R as measured by the vision system 42 and determined by the grinding control computer 62 is depicted in phantom lines. Also depicted in phantom lines is the wheel of a railroad car shown resting on the representative rail profile. An ideal rail I is superimposed on the representative rail profile R by first aligning the gauge points of the representative and ideal profiles. The ideal rail profile is then shifted downwardly relative to the representative rail profile R so that all points of the running surface RS on the ideal profile I lie on or below the representative rail profile R. The reasons for so aligning the ideal and representative profiles is that metal must be ground away from the representative rail profile in order for the representative rail profile to approximate the ideal profile; it is not possible to add metal to build up the worn rail. Moreover, it is only along the actual running surface RS, and the gauge sidewall 30, that the ideal and representative rail profile must be aligned as described above, since those are the only places where the wheel of a railroad car actually makes contact with the rail.

Program flow is next directed to decision block 210 where it is determined whether the railroad track rail, as described by the representative profile of the rail, requires grinding. If the rail profile is satisfactory, and no grinding needs to be done, the process ends. If grinding is required, program flow is directed from block 210 to decision block 211 where it is determined whether the representative rail profile can be corrected through grinding. If the rail is so deformed that grinding would not materially improve the rail profile, the process is complete, and the rail must be replaced. If it is determined in decision block 211 that the rail profile can be improved through grinding, program flow is directed to block 212 for placement of the grinding modules 64 of the rail grinding machine 100. Program flow is next directed to block 214 where the rails are ground along the measured interval. Once grinding is complete, program flow is redirected to block 202 to again view the rail along the interval for determination of whether more grinding is required.

The view rail profile step of block 202 is depicted with greater particularity in FIG. 19.

The railroad rail 20 is first illuminated by the strobe 50 of vision system 42 in block 215. Program flow is next directed to block 216 where the intersection of the rail footlight lines 70, 72 is used to establish a reference origin. Program flow is then directed to block 217 where a number of sample points across the crown surface 28 of railroad track rail 20 are represented in Cartesian coordinates relative to the reference origin established in block 216. While the number of points selected is somewhat arbitrary, fifty data points across the crown surface 28 of the rail 20 provides an adequate description of the surface of the rail 20 without unduly complicating the calculation of the representative rail profile in block 206. The fifty points across the crown surface 28 are not necessarily evenly spaced, but are more advantageously concentrated around the edges of the rail where the curvature of the rail changes the most.

Program flow is next directed from block 217 to decision block 218 where it is determined whether enough valid sample points across the crown surface 28 of the rail were obtained in an individual illumination (or vision frame) of the rail. In this regard, an obstruction, such as a rock or other foreign object, may be lying across the rail at the point of illumination, preventing a full set of valid sample points from being obtained from a particular vision frame. If enough sample points are not obtained, the vision frame is discarded and another illumination of the rail 20 immediately takes place. If a satisfactory number of sample points are obtained from a vision frame, program flow is returned from block 218 to decision block 204 of FIG. 18 for a determination of whether enough valid vision frames have been acquired to make up a valid interval.

The place stone step of block 212 is set forth in greater particularity in FIG. 20.

The process of placing grinding stones is begun at block 220 by assigning a predetermined number of potential grinding contact points along the representative rail profile surface. The grinding contact points are analogous to the sample points described above in conjunction with the view rail profile step of block 202. The sample points, however, relate to the actual, viewed profile of a vision frame. The grinding contact points relate to the representative rail profile, which is the result of the numerical analysis of all of the vision frames in a given interval.

Program flow is next directed to block 222 where the tangent of each grinding point is determined. The grinding depth between the representative rail profile and the ideal rail profile along the perpendicular to the tangent line of each grinding point is then determined in block 224.

Figure 21:
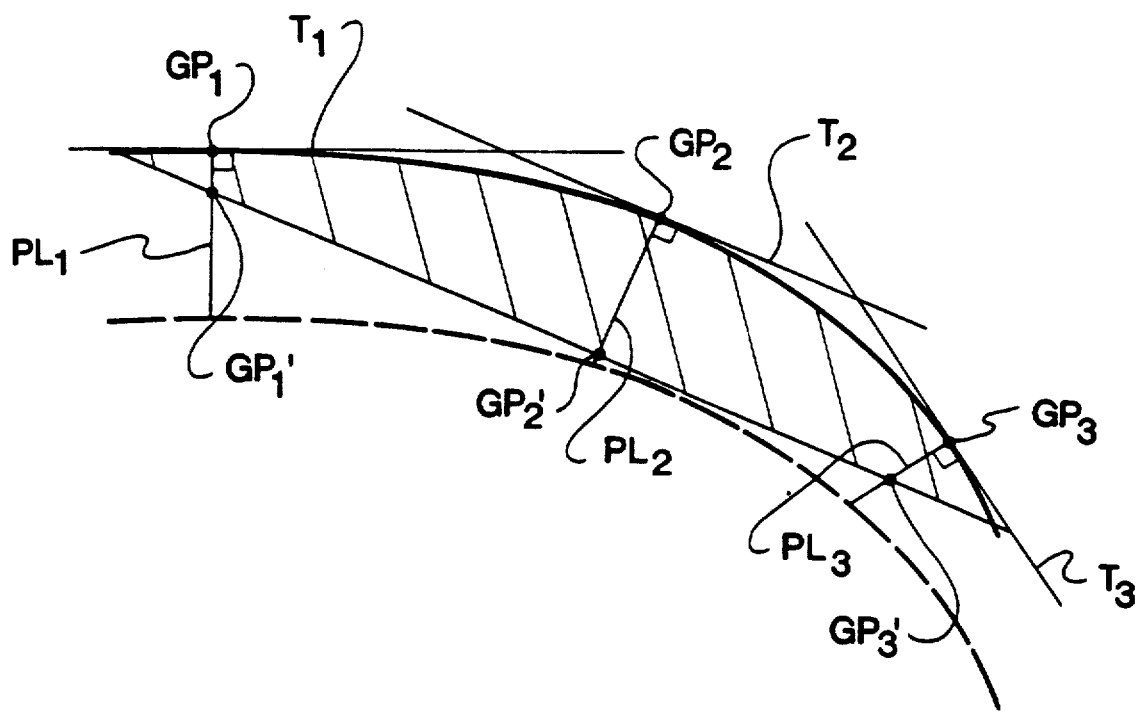
FIG. 21 is a schematic diagram of a worn rail profile with an ideal rail profile superimposed thereon, depicting the placing of tangent lines at grinding points along the worn rail profile and the results of grinding at one of the grinding points.

The steps of program blocks 222 and 224 are best understood with reference to FIG. 21. Three grinding points GP along a representative rail profile R are depicted in FIG. 21. The tangent lines, T1, T2, T3, for each of the grinding points GP1, GP2, GP3 are also depicted. While there are a variety of angles that a stone can be placed into contact with a particular grinding point, placing the stone of a grinding module along the tangent to the grinding point is considered as the most efficient orientation of the grinding module. The tangent for each grinding point is determined by taking a point to the left and to the right of each grinding point, calculating the slopes of the two lines defined by the three points, and then averaging the two slopes. The perpendicular line PL1, PL2, PL3 is then calculated for each tangent line GP1, GP2, GP3. The length of each perpendicular line PL between the representative profile and the ideal profile is then calculated as the grinding depth.

Program flow is directed from block 224 to decision block 226 where it is determined whether there are grinding modules 64 available. If all grinding modules 64 have been assigned, the program flow is directed to block 228, described in detail below. If there are grinding modules 64 remaining for assignment, program flow is directed to block 232 for the assignment of a grinding module. Once a grinding module 64 is assigned, program flow is directed to block 234 to begin the determination of the appropriate grinding point and grinding angle for the assigned grinding module.

The grinding point having the largest grinding depth, as measured along the perpendicular line PL to its tangent T, is selected as the grinding point for the assigned grinding module. If only a limited number of passes over the rail 20 by the grinding machine 100 can be made, choosing the grinding points in descending order of grinding depth ensures that at least the worst portions of the rail profile will be ground. Alternatively, it may be decided in advance that, for instance, burrs along portions of the field side of the rail need not be ground. In that case, grinding points at the predetermined positions will not be considered for grinding, regardless of their grinding depth relative to the other grinding points. Program flow is next directed to block 236 where the tangent line to the grinding point selected in block 234 is determined as the preferred grinding angle for the assigned grinding module.

Program flow is next directed to block 238 where the grinding control computer 62 predicts how much surface area of the rail 20 will be removed by grinding at the selected point and angle in one pass of the grinding machine 100 along the rail being ground. Moreover, the new position and tangent lines of the grinding points affected by one pass of the selected grinding module are predicted in block 238. The prediction step of block 238 can be understood with reference to FIG. 21, where the predicted positions of grinding points GP1, GP2, GP3 are depicted as GP1', GP2', and GP3'. Referring to FIG. 13, it will be appreciated that the grinding modules 64 are lined up one behind the other. The prediction step of block 238 is carried out so that the orientation of trailing grinding modules will be based on what the profile of the rail 20 is likely to be after grinding is accomplished by a leading grinding module.

Program flow is next directed to block 240, where it is determined whether the results of grinding, as predicted in block 238, will cause interference with known obstructions (such as at a switch or crossing in the railroad track), or whether grinding at the proposed angle will remove more material than desired at any of the grinding points due to gross irregularities in the rail profile or the like. Program flow is next directed to decision block 242 where the results of the analysis in block 240 are queried to determine whether the angle selected is satisfactory. If the grinding angle is not satisfactory, program flow is directed to block 244 where the grinding angle is adjusted to avoid the obstruction or to avoid the interference determined to exist at block 240. Program flow is then directed to decision block 245 to determine whether the adjusted angle can be attained by the assigned grinding module. If the adjusted angle is attainable, program flow is redirected to block 240 to analyze whether the new, adjusted angle avoids interference and obstructions.

Once an acceptable grinding angle for the assigned grinding module is selected, program flow is directed from decision block 242 to decision block 246. Block 246 determines whether too much metal will be removed from the railhead by grinding the rail with the grinding module operating at standard horsepower and at the selected angle. If too much metal will be removed (i.e., the rail 20 will be ground below the ideal profile) program flow is directed to the block 248 where the horsepower to the assigned grinding module is reduced, it being understood that operation of a module at reduced horsepower will remove less metal from the railhead. Program flow is then directed to decision block 250 where it is determined whether the reduced horsepower falls below the minimum required horsepower to operate the grinding module.

Program flow is directed from decision block 246 to block 252 if it is determined that grinding at standard horsepower will not remove too much metal from the railhead. Program flow will also be directed to block 252 from block 250 if it is determined that reducing the horsepower to the selected grinding module does not bring the horsepower level below the minimum required to operate the grinding module. At block 252, the calculated grinding angle and grinding horsepower for the selected module are stored in computer memory. Program flow is then directed to block 253 where any of the grinding points removed from consideration in block 247 (to be described below) are replaced, and program flow is directed to block 226 for the assignment of further grinding modules.

Program flow is directed to block 247 from either decision block 245 or 250 if it is determined that either the selected grinding angle (block 245) or the horsepower requirements for the grinding module (block 250) are not within acceptable limits. The grinding point for which the angle or horsepower requirements is unacceptable is removed from consideration at block 247. Once the grinding point has been removed from consideration, program flow is directed to decision block 251 to determine whether there are further grinding points for consideration. If there are grinding points remaining, program flow is redirected to block 234 for selection of another grinding point. It will be appreciated that the grinding module previously selected in block 232 is still available for assignment to a selected grinding point. Since the previously considered grinding point was removed from consideration in block 247, the grinding point with the next largest grinding depth will now be selected at block 234.

Program flow will be directed from block 226 to block 228 once it is determined that all the grinding modules of grinding machine 100 have been assigned for grinding. At decision block 228, the grinding horsepower requirements of the individual grinding modules are summed to determine whether the sum of the grinding module horsepower requirements is less than or equal to the optimum grinding machine horsepower. In other words, decision block 228 determines whether the programmed grinding operation will make use of all of the available grinding machine horsepower. If the power requirement is determined to be at the optimum horsepower, program flow is directed to block 214 (FIG. 18) for grinding of the rail. If horsepower requirements fall below the optimum, program flow is directed from block 228 to decision block 253, where it is determined whether the speed of the grinding machine 100 over the rails is less than the maximum desired speed for grinding operations. If machine speed is not less than the maximum desired speed, program flow is returned to block 214 for commencement of the grinding operation.

Assuming that the horsepower demands of the grinding modules will be less than the optimum available machine horsepower, and further assuming that machine speed can be increased, program flow will be directed from decision block 253 to block 230 where all grinding module settings are reinitialized, and the grinding machine speed is increased. In this regard, it will be appreciated that the amount of metal removed from a rail is a function of both the horsepower of the individual grinding module, and the speed with which the grinding module is carried across the rail. As the speed of the grinding module over the rail increases, grinding module horsepower must be increased to effect the same amount of metal removal. Increasing machine speed will therefore increase grinding module horsepower requirements. In the situation where the programmed grinding operation does not use all of the available machine horsepower, the same amount of grinding can be accomplished in a shorter time by increasing grinding machine speed and proportionately increasing the operating power of the grinding modules.

We claim:

1. A method for restoring the rail of a railroad track having a worn rail profile, said rail presenting a rail length extending along a rail longitudinal axis, including the steps of:

acquiring a plurality of data frames of the actual profile of the rail at a plurality of positions spaced apart along an interval of the length of said rail;

computing a single representative rail profile over said rail interval from said data frames;

comparing said representative rail profile to an ideal rail profile to determine the differences between said representative rail profile and said ideal rail profile along said interval; and grinding said rail along said interval to reduce said differences between said representative rail profile and said ideal rail profile.

2. The method as defined in claim 1, including the step of determining when the number of said plurality of acquired data frames is adequate to provide a statistically sound representative rail profile.

3. The method as claimed in claim 2, said top of determining when the number of said plurality of acquired data frames is adequate including the steps of selecting a predetermined number of data frames as comprising an adequate number of frames, and comparing the number of frames acquired to said predetermined number.

4. The method as claimed in claim 2, said step of determining when the number of said plurality of acquired data frames is adequate including the steps of computing an intermediate representative rail profile as each of said plurality of data frames is acquired and determining when the trend of said intermediate profile approaches a constant.

5. The method as claimed in claim 1, said step of grinding said rail along said interval including the steps of selecting a number of potential grinding contact points from said representative rail profile, determining the grinding depths between said potential grinding contact points and said ideal rail profile, and grinding said rail at the grinding contact point having the greatest depth to said ideal rail profile.

6. The method as claimed in claim 5, said step of determining the grinding depths including the step of determining the tangents of said potential grinding contact points, and determining said grinding depths normal to said tangents.

7. The method as claimed in claim 1, said step of grinding said rail including the step of providing a plurality of grinding modules, selecting a number of potential grinding contact points from said representative rail profile, determining the grinding depths between said potential grinding contact points and said ideal rail profile, and positioning a first one of said grinding modules at a first grinding contact point having the greatest depth to said ideal rail profile for grinding of said rail.

8. The method as claimed in claim 7, said step of grinding said rail including the step of redetermining the grinding depths of the remaining potential grinding contact points based on a prediction of the effect of grinding said rail at said first grinding contact point with said first module, positioning a second grinding module at a second grinding contact point having a grinding depth next largest to the grinding depth of said first grinding contact point, and grinding said rail at said first and second grinding contact points.

9. The method as claimed in claim 8, said grinding modules being carried by a grinding vehicle adapted for traveling along said rail and having a predetermined optimum grinding speed of travel along said rail, said method including the step of determining the power requirement of grinding said rail with said grinding modules; and increasing the speed of said grinding vehicle during said grinding step if the power requirement of said grinding modules is less than a predetermined optimum power requirement.

10. The method as claimed in claim 1, including the step of determining the amount of metal that will be removed from said rail by grinding said rail at said selected point along said profile at a predetermined normal grinding rate, and reducing said grinding rate if the amount of metal removed at said normal rate is more metal than required to restore said rail to said ideal profile.

11. The method as claimed in claim 10, including the step of determining whether said reduced grinding rate is less than a predetermined rate prior to grinding said rail at said selected point along said rail profile, and remaining from grinding said rail at said point if said reduced grinding rate is less than said predetermined required rate.

12. The method as claimed in claim 7, said step of determining the grinding depths including the step of determining the tangents of said potential grinding points, and determining said grinding depths normal to said tangents.

13. The method as claimed in claim 1, said rail presenting a rail foot having inclined gauge side and field side foot upper surfaces, an uppermost railhead, and an intermediate web defining a rail centerline extending between said rail foot and said rail head, said step of acquiring a plurality of data frames including the steps of:
 illustrating the rail with a generally planar beam of light to present a railhead light line and gauge side and field side foot light lines;
 establishing a reference origin from the intersection of the extension of said foot light lines; and
 determining the position of sample points along said railhead light line relative to said reference origin.

14. The method as claimed in claim 1, including the steps of acquiring a second plurality of data frames of the actual profile of said rail along said interval after said grinding of said rail, recomputing said representative rail profile from said second plurality of data frames, comparing said recomputed representative rail profile to said ideal rail profile, and regrinding said rail along said interval to reduce said differences between said recomputed representative rail profile and said ideal rail profile.

15. The method as claimed in claim 14, said steps of grinding and acquiring said second plurality of data frames being accomplished in a first pass along said interval in a first direction along said rail, and said step of regrinding being accomplished in a second pass along said interval in a second, opposite direction along said rail.

16. The method as claimed in claim 1, said representative rail profile and said ideal rail each presenting a respective gauge sidewall and an upper running surface, said step of comparing said representative rail profile to said ideal rail profile including the steps of aligning said representative rail profile and ideal rail gauge sidewalls, and aligning the running surface of the ideal rail profile relative to the running surface of said representative rail profile such that all points of the ideal rail profile are on or below the running surface of the representative rail profile.

17. The method as claimed in claim 1, said rail presenting a rail head surface, said step of acquiring said data frames including the step of representing the rail at each of said positions as a number of sample points, said step of computing said representative rail profile including the step of determining whether the number of valid sample points for each said position is adequate to represent the rail profile at that position, and discarding data frames wherein said number of valid sample points is deficient.

18. A method for restoring the rail of a railroad track having a worn rail profile, said rail presenting a rail length extending along a rail longitudinal axis, including the steps of:
 determining the profile of the rail at a portion of the rail to be restored;
 comparing said rail profile to an ideal rail profile to determine the differences between said rail profile and said ideal rail profile at selected points along said rail profile;
 determining a first one of said selected points having the greatest difference between said rail profile and said ideal rail profile; and
 grinding said rail to reduce said difference between said rail profile and said ideal rail profile at said first one of said selected points along said rail profile.

19. The method as claimed in claim 18, including the steps of determining a second one of said selected points having the next greatest difference between said rail profile and said ideal rail profile from said first one of said selected points, and grinding said rail to reduce said difference between said rail profile and said ideal rail profile at said second one of said selected points.

20. The method as claimed in claim 18, said step of grinding said rail including the step of providing a plurality of grinding modules, selecting a number of potential grinding contact points from said rail profile, determining the grinding depths between said potential grinding contact points and said ideal rail profile, and positioning a first one of said grinding modules at a first grinding contact point having the greatest depth to said ideal rail profile for grinding of said rail.

21. The method as claimed in claim 31, said step of grinding said rail including the step of redetermining the grinding depths of the remaining potential grinding contact points based on a prediction of the effect of grinding said rail at said first grinding contact point with said first module, positioning a second grinding module at a second grinding contact point having a redetermined grinding depth next largest to the grinding depth of said first grinding contact point, and grinding said rail at said first and second grinding contact points.

22. The method as claimed in claim 21, said step of determining the grinding depths including the step of determining the tangents of said potential grinding points, and determining said grinding depths normal to said tangents.

23. The method as claimed in claim 21, said grinding modules being carried by a grinding vehicle adapted for traveling along said rail and having a predetermined optimum grinding speed of travel along said rail, said method including the step of determining the power requirement of grinding said rail with said grinding modules, and increasing the speed of said grinding vehicle during said grinding step if the power requirement of said grinding modules is less than a predetermined optimum power requirement.

24. The method as claimed in claim 18, including the step of determining the amount of metal that will be removed from said rail by grinding said rail at said selected point along said profile at a predetermined normal grinding rate, and reducing said grinding rate if the amount of metal removed at said normal rate is more metal than required to restore said rail to said ideal profile.

25. The method as claimed in claim 24, including the step of determining whether said reduced grinding rate is less than a predetermined required rate prior to grinding said rail at said selected point along said rail profile, and refraining from grinding said rail at said point if said reduced grinding rate is less than said predetermined required rate.

* * * * *

UNITED STATES PATENT AND TRADEMARK OFFICE
CERTIFICATE OF CORRECTION

PATENT NO. : 5,140,776

DATED : August 25, 1992

INVENTOR(S) : Darwin H. Isdahl and Robert J. Monson

It is certified that error appears in the above-identified patent and that said Letters Patent is hereby corrected as shown below:

Column 10, line 30, delete the word "defined" and substitute therefor --claimed--.

Column 10, line 34, delete the word "top" and substitute therefor --step--.

Column 11, line 33, delete the word "remaining" and substitute therefor --refraining--.

Column 12, line 58, delete the number"31" and substitute therefor --20--.

Signed and Sealed this

Nineteenth Day of October, 1993

Attest:

BRUCE LEHMAN

*Attesting Officer*     *Commissioner of Patents and Trademarks*